United States Patent [19]

Burri

[11] Patent Number: 5,012,436

[45] Date of Patent: Apr. 30, 1991

[54] SENSOR ARRANGEMENT WITH AMPLIFIER OFFSET CANCELLATION

[75] Inventor: Michel Burri, Geneva, Switzerland

[73] Assignee: Motorola, Inc., Schaumburg, Ill.

[21] Appl. No.: 417,416

[22] Filed: Oct. 5, 1989

[30] Foreign Application Priority Data

Oct. 28, 1988 [GB] United Kingdom ............... 8825257

[51] Int. Cl.$^5$ ..................... G01L 27/00; H03F 1/02
[52] U.S. Cl. .................... 364/571.02; 73/4 R; 330/9
[58] Field of Search ............... 364/550, 551.01, 558, 364/571.01, 571.02, 571.03; 73/1 R, 4 R, 708; 330/9

[56] References Cited

U.S. PATENT DOCUMENTS

| | | | |
|---|---|---|---|
| 4,048,574 | 9/1977 | Barbier et al. | 330/9 |
| 4,104,596 | 8/1978 | Smither | 330/9 |
| 4,138,649 | 2/1979 | Schaffer | 330/9 |
| 4,192,005 | 3/1980 | Kurtz | 364/558 X |
| 4,242,634 | 12/1980 | Metcalf | 328/160 X |
| 4,392,112 | 7/1983 | Schade, Jr. | 330/9 X |
| 4,399,515 | 8/1983 | Gross | 364/558 X |
| 4,560,975 | 12/1985 | Jarva | 330/9 X |
| 4,565,097 | 1/1986 | Dimeff | 73/708 X |
| 4,588,308 | 5/1986 | Saito | 364/571.03 X |
| 4,598,381 | 7/1986 | Cucci | 73/708 X |
| 4,641,105 | 2/1987 | Albaugh et al. | 330/9 |
| 4,715,003 | 12/1987 | Keller et al. | 364/571.03 |
| 4,788,867 | 12/1988 | Kishel | 73/708 X |
| 4,827,161 | 5/1989 | Kunitoki et al. | 307/491 |
| 4,847,794 | 7/1989 | Hrubes | 73/708 X |

Primary Examiner—Joseph L. Dixon
Attorney, Agent, or Firm—Michael D. Bingham; Bradley J. Botsch

[57] ABSTRACT

A sensor arrangement, particularly suitable for pressure sensors is disclosed, in which differential output signals from a pressure sensor are switched between two amplifiers and fed to a microcomputer where they are stored as two pairs of signals in digital form. The two pairs of signals are combined to cancel amplifier offset voltages.

1 Claim, 2 Drawing Sheets

SENSOR ARRANGEMENT WITH AMPLIFIER OFFSET CANCELLATION

BACKGROUND OF THE INVENTION

This invention relates to a sensor arrangment for a sensor having a differential output. The arrangement is particularly although not exclusively useful for pressure sensors.

Pressure sensor elements are known to suffer from two major variations namely device to device variations and temperature effects.

Device variations take the form of an offset, which is the voltage output of the sensor for zero applied pressure, which offset differs for different devices, and a variation in the full scale output of the device.

Temperature variations influence both the offset and the full scale of pressure sensors. In respect of the offset the entire output voltage versus pressure characteristic is shifted whilst the effect of temperature changes on the full scale is to change the slope of the characteristic.

It is usual to use an operational amplifier to increase the amplitude of the pressure sensor signal. Such amplifiers themselves introduce errors such as input voltage and current offsets and an input bias current which develop an output voltage offset.

In order to compensate for these amplifier voltage offsets for absolute value and temperature variations it is necessary to utilize precision dedicated operational amplifiers with an extensive calibration procedure, which must be carried out for each sensor-amplifier unit. This procedure can be the most expensive part of the manufacturing process.

This invention seeks to provide an improved sensor arrangement in which the above mentioned problem is mitigated.

SUMMARY OF THE INVENTION

According to one aspect of the invention there is provided a sensor arrangement comprising a sensor having first and second outputs; first and second amplifier means; switching means for switching coupling of the first and second sensor outputs between the first and second amplifier means to provide two pairs of amplifier output signals; control means for controlling switching of the switching means; storage means for storing signals representative of the two pairs of amplifier output signals and combining means for combining the stored signals substantially to cancel amplifier offset voltages.

In a preferred embodiment the sensor is a pressure sensor.

The first and second amplifier means are typically operational amplifiers.

The arrangement may further include analogue to digital conversion means for converting the two pairs of amplifier output signals to digital signals to provide said representative signals.

The storage means may conveniently comprise digital storage register means.

In a preferred embodiment the storage means and the combining means are formed by a microcomputer operative to store and combine digital signals derived from said two pairs of amplifier output signals.

The microcomputer may also comprise said control means and has a control output coupled to control the switching of the switching means.

According to a second aspect of the invention there is provided a method of processing sensor signals including the steps of switching first and second signals provided by the sensor between first and second amplifier means to provide two pairs of amplifier output signals, storing signals representative of the two pairs of amplifier output signals and combining the stored signals substantially to cancel amplifier offset voltages.

In a preferred embodiment the stored signals of each pair are subtracted from one another within their pairs and the results of the subtractions are combined.

BRIEF DESCRIPTION OF THE DRAWING

An exemplary embodiment of the invention will now be described with reference to the drawings in which.

DETAILED DESCRIPTION OF THE INVENTION

Figure 1:
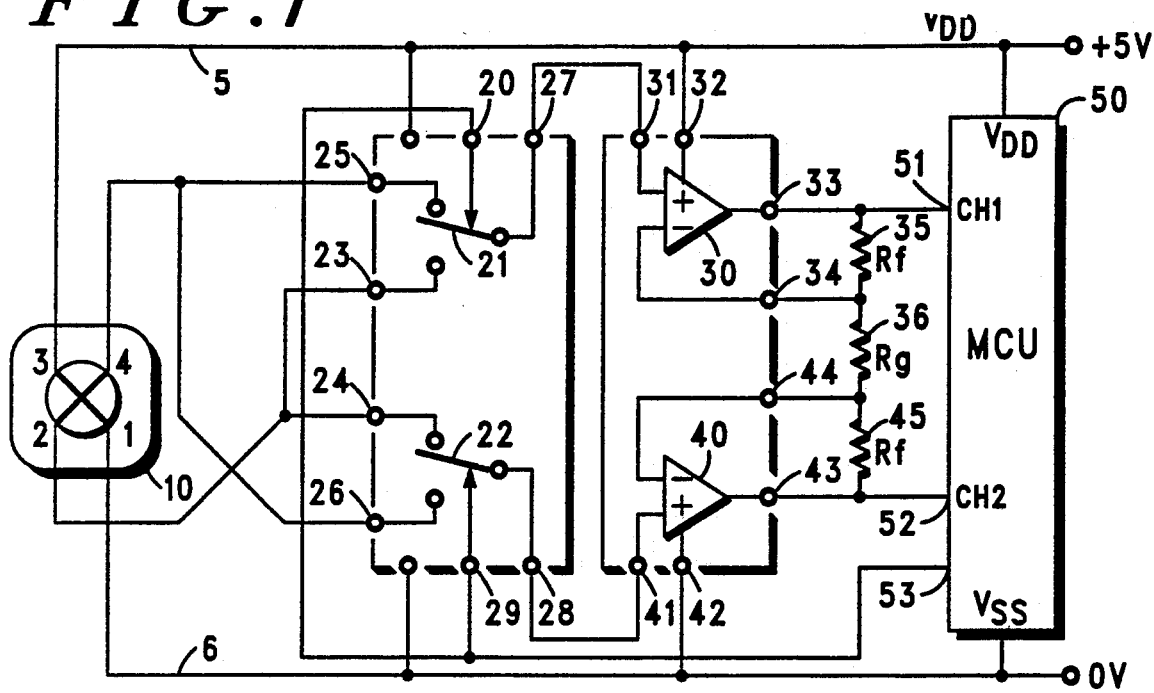
FIG. 1 shows a sensor arrangement in accordance with the invention.

Referring to FIG. 1 a pressure sensor 10 which is typically a Motorola MPX 2100AP unit has inputs 1 and 3 which are coupled respectively to supply lines 5 and 6 and has differential outputs 2 and 4.

The outputs 2 and 4 of the sensor 10 are coupled to two switches 21 and 22. The switch 21 has inputs 23 and 25 which are respectively coupled to the sensor outputs 2 and 4 whilst the switch 22 has inputs 24 and 26 which are similarly coupled to the sensor outputs 2 and 4.

The switch 21 has an output 27 which is coupled to one input 31 of an operational amplifier 30. The switch 22 has an output 28 which is coupled to one input 41 of an operational amplifier 40. The operational amplifiers 30 and 40 are advantageously formed as a single dual operational amplifier integrated circuit 64, such as a Motorola MC33078, having supply inputs 32 and 42 respectively coupled to the supply lines 5 and 6.

The operational amplifiers 30 and 40 have outputs 33 and 43 which are coupled to respective input channels 51 and 52 of a microcomputer unit 50. The amplifier 30 and 40 have second inputs 34 and 44 respectively which are coupled to respective outputs 33 and 43 via respective feedback resistors 35 and 45. A gain control resistor 36 is connected between the second inputs 34 and 44 of the amplifiers 30 and 40.

Finally the microcomputer (MCU) 50 has a control output 53 which is coupled to control inputs 20 and 29 of the switches 21 and 22.

In operation the control output 53 of the MCU 50 controls the switches 21 and 22 via control inputs 20 and 29 so that the sensor output 2 is coupled via the switch 21 to the operational amplifier 30 and the sensor output 4 is coupled to the operational amplifier 40.

The amplifier 30 provides an output voltage V1 which is coupled to the input 51 of the MCU 50 and the amplifier 40 provides an output voltage V2 which is fed to the input 52 of the MCU 50.

The voltages V1 and V2 are converted to digital values by analogue to digital converter means in the MCU 50 and the digital valves are stored in the registers R1 and R2.

The MCU 50 via its control output 53 changes over the switches 21 and 22 so that their inputs are reversed and the sensor output 2 is coupled via the switch 22 to the amplifier 40 whilst the output 4 is connected via the switch 21 to the amplifier 30.

The amplifier 30 provides an output voltage V1C which is stored in digital form in a register R1C in the MCU 50 whilst the amplifier 40 provides an output voltage V2C which is stored in digital form in a register R2C.

The first transfer function of the arrangement is obtained by combining the contents of the four registers in the following way:

(R1−R2)+(R2C−R1C)

The actual value stored in the MCU is given in counts or bits as:

$$\text{count} = (V1 - V2) + (V2C - V1C) \times \frac{2^{n-1}}{VRH - VRL}$$

where n is the number of bits of analogue to digital conversion and VRH and VRL are the values of the supply voltages coupled to the lines 5 and 6 respectively.

Assuming that V1−V2=VPS×AV where VPS is the pressure sensor output voltage and AV is the gain of the operational amplifiers, then for 8 bit A to D conversion and a 5 volt supply $$\text{count} = 2 \times VPS \times AV \cdot \frac{255}{5}$$

The MPX 2100AP pressure sensor has a VPS of 20 mV at voltage supply Vs of 5V and a maximum pressure of 100 kPa. With a gain AV of 113 chosen to maximise the number of counts available in the MCU register and the excursion of the output voltage of the amplifier:

count=0.020×113×102=230

The resolution is thus 0.43 kPa per count or bit. Considering now the above calculation in more detail with respect to the signals involved, the output signals S2 and S4 are provided by the sensor outputs 2 and 4 and we have, with outputs 2 and 4 respectively coupled to amplifiers 30 and 40

S2=a(p)+of2

S4=b(p)+of4 where a(p) and b(p) are functions of pressure and of2 and of4 are pressure sensor offsets.

Thus V1=G1(S2+OF1)

V2=G2(S4+OF2)

where G1 and G2 are the gains of the amplifiers 30 and 40 and OF1 and OF2 are the voltage offsets of those amplifiers.

Reversing the switches 21 and 22 gives

V1C=G1(S4+OF1)

V2C=G2(S2+OF2)

V1−V2=G1(S2+OF1)−G2(S4+OF2)

V2C−V1C=G2(S2+OF2)−G1(S4+OF1)

$$(V1 - V2) +$$
$$(V2C - V1C) = G1 \cdot S2 + G2 \cdot S2 - G1 \cdot S4 -$$
$$G2 \cdot S4 + G1 \cdot OF1 - G2 \cdot OF2 -$$
$$G1 \cdot OF1 + G2 \cdot OF2$$
$$= S2(G1 + G2) - S4(G1 + G2)$$
$$= (G1 + G2) \cdot (S2 - S4)$$

Thus the offset voltage OF1 and OF2 of the amplifiers 30 and 40 together with temperature variations are completely cancelled.

The final result is $$V_{out} = G \cdot 2 \cdot (S2 - S4) = G_T[(a(p) + of2) - (b(p) + of4)]$$
$$= G_T[V(P) + V \text{ offset}]$$

where GT is the overall gain of the transfer function of the arrangement.

Figure 2:
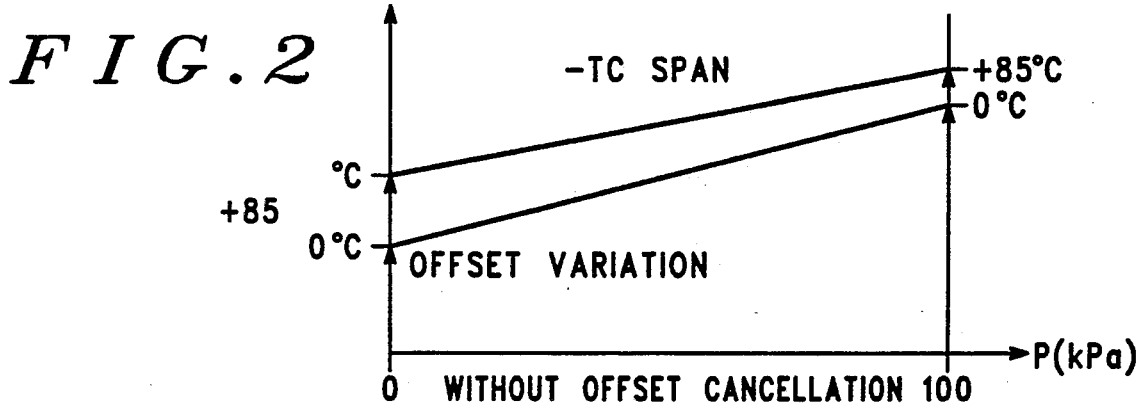
FIGS. 2-3 are explanatory graphs.
Figure 3:
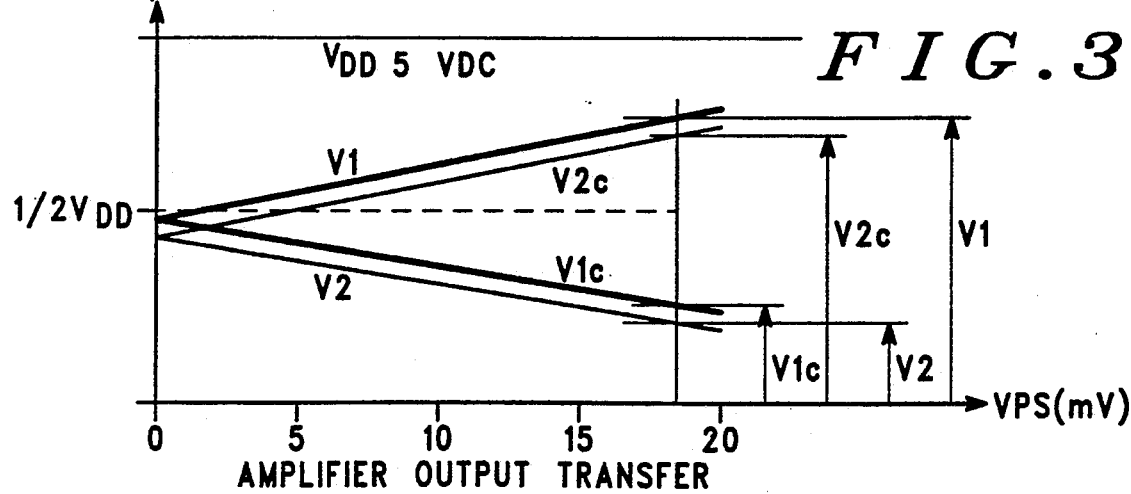

The advantages of the sensor arrangement of the invention are illustrated in the graphical FIGS. 2 and 3.

FIG. 2 shows the direct output of the pressure sensor 10. As can be seen the full scale and the offset have a positive TC. The variation of the full scale output with temperature, may be compensated by the use of resistors, namely the resistors 35, 36 and 45 used to fix the gain of the amplifiers.

The overall transfer characteristic of the sensor arrangement of the invention is shown in FIG. 3 and has an excellent common mode rejection ratio and minimizes the number of external passive components required to set the gain of the amplifiers. The resolution and sensitivity of the digitally converted signal is improved and expensive calibration steps are avoided.

Figure 4:
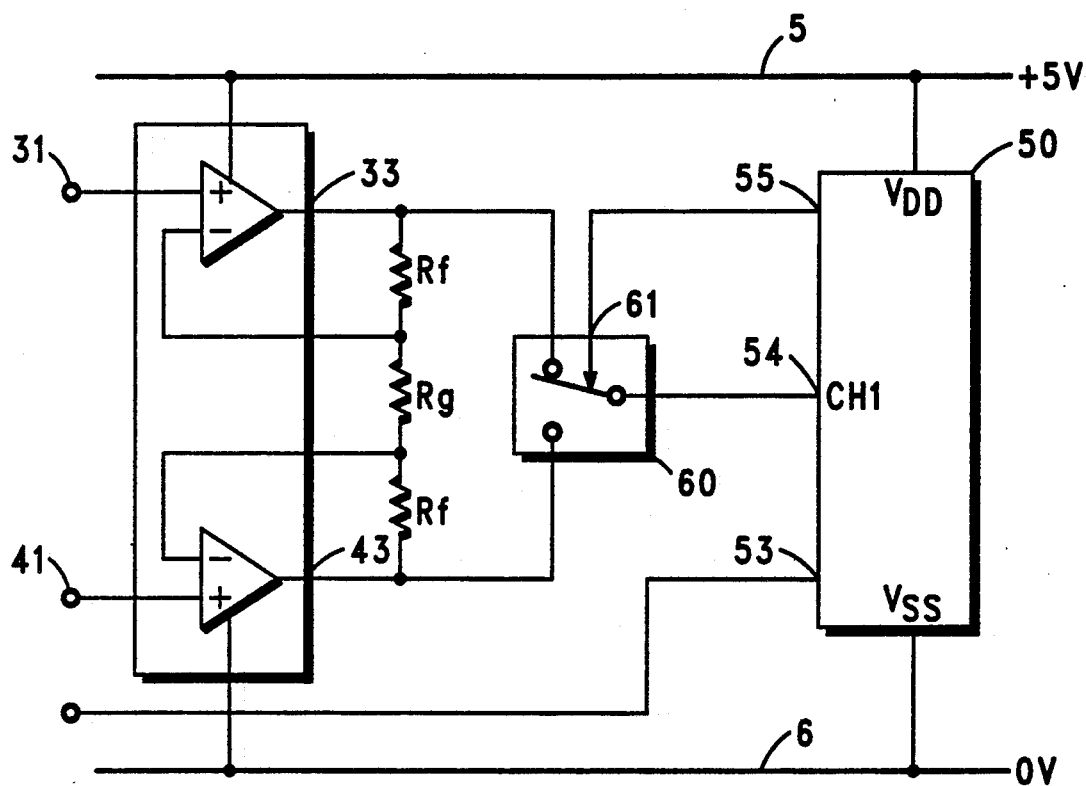
FIG. 4 shows part of an alternative embodiment of the sensor arrangement of the invention.

Referring to FIG. 4 there is shown part of an alternative embodiment of sensor arrangement in accordance with the invention. Like parts to those in FIG. 1 have the same reference numbers.

This embodiment is the same as that of FIG. 1 except that the outputs 33 and 34 of the amplifiers 30 and 40 are now fed in turn to a single input port 54 of the microcomputer unit 50 via a switch 60 which is controlled by the MCU 50 by means of a control output 55 coupled to a control input 61 of switch 60. The MCU controls the switch 60 to coupled firstly the output of the amplifier 30 followed by the output of the amplifier 40 to its input port 54. As before the voltage outputs of the two amplifiers 30 and 40 are stored, after analogue to digital conversion, in registers R1 and R2.

On commutation of the switches 21 and 22 the process is repeated with the voltage outputs of the amplifiers 30 and 40 being fed in turn to be stored as digital values in registers R1C and R2C. The MCU 50 then performs the calculations as described above with reference to FIG. 1.

The invention has been described by way of example and modifications may be made without affecting the scope of the invention. In particular although the invention is particularly useful for pressure sensor applications it may be used with any sensor having a differential output.

I claim:

1. A method of processing sensor signals including the steps of:

connecting during a first measurement stage first and second signals provided by the sensor to respective ones of first and second amplifier means;

reversing the connections to the first and second amplifier means during a second measurement stage to provide two pairs of amplifier output signals;

storing signals derived from the two pairs of amplifier output signals;

combining the stored signals to substantially cancel amplifier offset voltages; and subtracting the stored signals of each pair from one another within their pairs so that in each pair, signals derived from the first output of the sensor are subtracted from the signals derived from the second output and the results of the subtractions are combined.

* * * * *